US009309666B2

(12) United States Patent
Blanchard et al.

(10) Patent No.: US 9,309,666 B2
(45) Date of Patent: *Apr. 12, 2016

(54) WALL COVERING FOR THERMAL AND ACOUSTIC COMFORT

(75) Inventors: Benjamin Blanchard, Taverny (FR); Katarzyna Chuda, Villejuif (FR)

(73) Assignee: SAINT-GOBAIN ADFORS, Chambery (FR)

( * ) Notice: Subject to any disclaimer, the term of this patent is extended or adjusted under 35 U.S.C. 154(b) by 13 days.

This patent is subject to a terminal disclaimer.

(21) Appl. No.: 14/240,634

(22) PCT Filed: Aug. 20, 2012

(86) PCT No.: PCT/FR2012/051910
§ 371 (c)(1),
(2), (4) Date: Jul. 10, 2014

(87) PCT Pub. No.: WO2013/026983
PCT Pub. Date: Feb. 28, 2013

(65) Prior Publication Data
US 2015/0050469 A1      Feb. 19, 2015

(30) Foreign Application Priority Data

Aug. 25, 2011  (FR) ...................................... 11 57516

(51) Int. Cl.
| | | |
|---|---|---|
| *B32B 3/00* | (2006.01) | |
| *E04B 1/88* | (2006.01) | |
| *B32B 5/02* | (2006.01) | |
| *B32B 5/18* | (2006.01) | |
| *B32B 7/14* | (2006.01) | |
| *G10K 11/168* | (2006.01) | |
| *B32B 5/08* | (2006.01) | |
| *B32B 37/12* | (2006.01) | |
| *E04C 2/24* | (2006.01) | |
| *E04B 1/74* | (2006.01) | |

(52) U.S. Cl.
CPC . *E04B 1/88* (2013.01); *B32B 5/022* (2013.01); *B32B 5/024* (2013.01); *B32B 5/08* (2013.01); *B32B 5/18* (2013.01); *B32B 7/14* (2013.01); *B32B 37/1284* (2013.01); *E04C 2/243* (2013.01); *G10K 11/168* (2013.01); *B32B 2037/1215* (2013.01); *B32B 2250/03* (2013.01); *B32B 2262/04* (2013.01); *B32B 2262/101* (2013.01); *B32B 2307/72* (2013.01); *B32B 2309/105* (2013.01); *B32B 2607/02* (2013.01); *E04B 2001/742* (2013.01); *Y10T 156/10* (2015.01); *Y10T 428/24826* (2015.01); *Y10T 428/24851* (2015.01)

(58) Field of Classification Search
CPC .......... B32B 5/022; B32B 5/245; B32B 7/12; B32B 2307/102; B32B 2307/7246; B32B 2607/02; Y10T 428/24581; Y10T 428/2915
See application file for complete search history.

(56) References Cited

U.S. PATENT DOCUMENTS

| | | |
|---|---|---|
| 4,283,457 A | 8/1981 | Kolsky et al. |
| 4,388,366 A | 6/1983 | Rosato et al. |
| 4,766,028 A | 8/1988 | Rich |
| 5,364,681 A | 11/1994 | Pate et al. |
| 5,493,081 A | 2/1996 | Manigold |
| 5,632,844 A | 5/1997 | Pate et al. |
| 5,681,408 A | 10/1997 | Pate et al. |
| 5,824,973 A | 10/1998 | Haines et al. |
| 6,030,559 A | 2/2000 | Barry et al. |
| 6,204,209 B1 | 3/2001 | Rozek et al. |
| 6,220,388 B1 | 4/2001 | Sanborn |
| 6,256,600 B1 | 7/2001 | Bolton et al. |
| 6,345,688 B1 | 2/2002 | Veen et al. |
| 6,428,652 B1 | 8/2002 | Kolhammer et al. |
| 6,443,257 B1 | 9/2002 | Wiker et al. |
| 6,720,068 B1 | 4/2004 | VanBemmel et al. |
| 6,841,025 B2 | 1/2005 | Kolhammer et al. |
| 6,863,970 B2 | 3/2005 | Novak |
| 6,902,694 B2 | 6/2005 | Novak |
| 7,096,890 B2 | 8/2006 | Woolstencroft et al. |

(Continued)

FOREIGN PATENT DOCUMENTS

| | | |
|---|---|---|
| CH | 650 196 | 7/1985 |
| EP | 0 061 369 | 9/1982 |

(Continued)

OTHER PUBLICATIONS

International Preliminary Report on Patentability and the Written Opinion of the International Searching Authority as issued in International Patent Application No. PCT/FR2012/051910, dated Feb. 24, 2014.

(Continued)

*Primary Examiner* — Elizabeth Mulvaney
(74) *Attorney, Agent, or Firm* — Pillsbury Winthrop Shaw Pittman LLP

(57) ABSTRACT

A multilayer wall covering includes: (a) a support layer formed by an organic polymer foam having an open porosity of between 0.50 and 0.995, or by a viscose fiber nonwoven having a mass per unit area of between 150 g/m2 and 500 g/m2, (b) a surface layer formed by a glass textile, having a static air flow resistance, measured according to the standard ISO 9053, of between 105 N·s·m−4 and 106 N·s·m−4, (c) at the interface between the support layer (a) and the surface layer (b), a discontinuous adhesive layer having a mass per unit area of between 17 and 60 g/m2. There is also provided a process including the use of such a covering for improving both the acoustic and the thermal comfort of a room, and two processes for manufacturing such a covering.

29 Claims, No Drawings

(56) References Cited

U.S. PATENT DOCUMENTS

| | | |
|---|---|---|
| 7,137,477 B2 | 11/2006 | Keller et al. |
| 7,320,739 B2 | 1/2008 | Thompson et al. |
| 7,591,346 B2 | 9/2009 | Thompson et al. |
| 2002/0117352 A1 | 8/2002 | Veen et al. |
| 2004/0002274 A1 | 1/2004 | Tilton |
| 2009/0173569 A1 | 7/2009 | Levit et al. |
| 2009/0173570 A1 | 7/2009 | Levit et al. |

FOREIGN PATENT DOCUMENTS

| | | |
|---|---|---|
| EP | 0 271 681 | 6/1988 |
| FR | 2 672 908 | 8/1992 |
| FR | 2 768 448 | 3/1999 |
| FR | 2 803 860 | 7/2001 |
| FR | 2 932 499 | 12/2009 |

OTHER PUBLICATIONS

International Search Report as issued for International Application No. PCT/FR2012/051910, dated Nov. 28, 2012.

Beranek, L., "Acoustic Impedance of Porous Materials," J.A.S.A., vol. 13, Jan. 1942, pp. 248-260.

Notice of Allowance as issued in U.S. Appl. No. 14/235,326, dated Aug. 12, 2015.

WALL COVERING FOR THERMAL AND ACOUSTIC COMFORT

CROSS-REFERENCE TO RELATED APPLICATIONS

This application is the U.S. National Stage of PCT/FR2012/051910, filed Aug. 20, 2012, which in turn claims priority to French Application No. 1157516, filed Aug. 25, 2011. The content of both applications are incorporated herein by reference in their entirety.

The present invention relates to a paintable multilayer wall covering which comprises a glass textile adhesively bonded to an open-porosity support and which, when painted, has a significant sound absorption capacity and a low thermal diffusivity and effusivity. It also relates to a process for manufacturing such a covering and to the use thereof for improving the acoustic comfort and the thermal comfort of a room or of a building.

The concept of "acoustic comfort", like the idea of comfort in general, is a relatively subjective concept. However, there is generally agreement in defining good acoustic comfort by a good intelligibility of sounds such as human voices or music, a reverberation time that is neither too short, to avoid the impression of muffled sounds, nor too long, to avoid a residual echo that is too pronounced, and the absence of sound having an excessive sound power. The quality of the acoustic comfort is primarily governed by the attenuation of sounds using sound-absorbing materials, fixed for example to the walls and/or to the floor.

It is important to distinguish acoustic comfort from acoustic insulation. When sound encounters an obstacle, such as a wall of a building, one portion of the incident sound energy is reflected, another is absorbed and a third is transmitted by the obstacle. The purpose of acoustic insulation is to reduce the transmission of the sound, whereas the objective of improving acoustic comfort is to reduce and optimize the reflected component of the sound.

The two most greatly used parameters for evaluating the quality of acoustic comfort are the reverberation time and the sound absorption coefficient, also referred to as the alpha Sabine index ($\alpha_w$). The latter is defined as the ratio of the sound energy absorbed by a given material to the incident sound energy ($E_a/E_i$). The alpha Sabine index is determined by diffuse field measurements carried out according to the standard NF EN ISO 354 (Measurement of sound absorption in a reverberation room) and is calculated in accordance with the standard NF EN ISO 11654 (Absorbers for use in buildings—Rating of sound absorption).

From the sound absorption coefficient obtained in a diffuse field, different performance classes are defined, described in the standard NF EN ISO 11654.

Generally speaking, a sound-absorbing material or covering having a given porous structure and chemical nature absorbs sound more effectively to the extent it is thick; in other words, its $\alpha_w$ index increases with the thickness. For reasons that are easy to understand, however, it is not desirable to market wall coverings having an excessive thickness. They would require large storage and transport capacities and their installation by private individuals would be difficult. An excessive thickness, for example beyond around 1 cm, would also pose esthetic problems, in particular in the field of housing for private individuals.

Another problem of sound-absorbing wall coverings is their surface appearance. The best sound absorption properties are generally obtained with coatings that have a porous surface layer, highly permeable to air and therefore to sound. Such porous surface layers are not however always satisfactory from an esthetic viewpoint, in particular they are not generally intended to be painted, and when they may be covered with a layer of paint, their sound absorption capacity decreases drastically.

The thermal comfort of a room or building, contrary to what might be thought, does not come down simply to a pleasant air temperature. There are two standards that define thermal comfort, these being the standard ISO7730 and the standard ISO1525. These two standards define an operative temperature, also sometimes referred to as perceived temperature, which is the equivalent of a weighted mean between the air temperature and the radiant temperature (temperature of the walls in the room). The operative temperature is defined by the following formula:

$$T_{operative} = \alpha \times T_{air} + (1-\alpha) \times T_{radiant}$$

in which the coefficient $\alpha$ represents the thermal contribution from convection. Its value is generally between 0.4 and 0.5, which means that the radiant temperature makes an equal, if not greater, contribution to the thermal comfort of a room than the air temperature.

The radiant temperature (temperature on the surface of the walls in a room) is dependent on two parameters: the thermal effusivity and the thermal diffusivity.

The thermal effusivity (b), defined by the formula $b = \sqrt{\lambda \rho C_p}$ where
$\lambda$ is the thermal conductivity of material (expressed in $W \cdot m^{-1} \cdot K^{-1}$),
$\rho$ is the density of the material (in $kg/m^{-3}$) and
$C_p$ is the specific heat capacity of the material (in $J \cdot kg^{-1} \cdot K^{-1}$), characterizes the capacity of a material to exchange, via its surface, thermal energy with its surroundings.

The thermal diffusivity (a), defined by the formula $$a = \frac{\lambda}{\rho C_p}$$

where $\lambda$, $\rho$ and $C_p$ have the same meaning as above, characterizes the rate of displacement of the heat energy through the mass of a material.

In periods of heating or cooling of a room by conventional methods, the air temperature changes considerably faster than the radiant temperature. An improvement in the thermal comfort would involve, for example, reducing this thermal inertia on the part of the walls; in other words, bringing the thermal characteristics of the walls closer to those of the air, this being obtained by means of a reduction in the thermal diffusivity and effusivity values.

The objective of the present invention is to propose a paintable wall covering having both low thermal diffusivity and effusivity and, even in the painted state, a sound absorption coefficient that enables it to be classified, as a sound-absorbing covering according to the standard NF EN ISO 11654, at least in class E ($\alpha_w = 0.15$ to $0.25$), and having an overall thickness that does not exceed 3 mm.

The wall covering of the present invention must thus contribute significantly to the thermal comfort of a room and combine good sound absorption properties and a satisfactory esthetic appearance, as close as possible to commercial paintable wall coverings, such as the coverings based on glass fiber cloth.

A certain number of documents describe heat- and sound-insulating multilayer wall coverings.

Thus, application CH 650 196 describes a multilayer wall covering comprising an open-porosity foam support containing fillers and fire-retardant components, and a textile surface layer, for example made of polyester. Inserted between the two layers is a perforated aluminum foil, intended to improve the fire resistance of the covering.

Application FR 2 672 908 describes a multilayer wall covering in which a layer of fabric is adhesively bonded by means of a heat-sealing continuous film to a foam support, said foam support being in turn adhesively bonded by means of a second heat-sealing continuous film to an underlayer.

Similarly, FR 0 061 369 discloses a wall covering in which a synthetic polymer textile is adhesively bonded by means of a heat-sealing continuous film made of polyethylene to a sheet of open-porosity foam.

EP 0 271 681 discloses a sound-absorbing wall covering in which an air-permeable paper or fabric layer is adhesively bonded to a spacer structure, for example a textile, perforated board or a plastic grid. The fabric-covered spacer structure is in turn adhesively bonded to a sound-absorbing porous structure.

U.S. Pat. No. 5,681,408 describes a sound-absorbing multilayer wall covering where two relatively loose textiles are adhesively bonded to one another by means of a polyethylene film.

U.S. Pat. No. 4,283,457 describes a sound-absorbing wall covering in which a needle-punched felt made of glass fibers is adhesively bonded by means of a reactive adhesive to an open-porosity polyurethane foam. The material is described as having good sound absorption properties, but these properties are obtained on a very thick covering, having a thickness of between one and two centimeters, and in the unpainted state. The needle-punched felt made of glass fibers that forms the surface layer of this covering does not lend itself, or not very well, to the application of an acrylic or glyptal paint.

None of these documents discloses a covering based on glass textile having, even at low thickness and in the painted state, both a sound absorption coefficient ($\alpha_w$) of greater than or equal to 0.15, allowing a classification as a sound absorber according to the standard NF EN ISO 11654, and a thermal effusivity of less than 390 $W/(m^2 \cdot K \cdot s^{1/2})$.

The applicant, after many diffuse-field sound absorption tests on painted or unpainted wall coverings, based on a glass textile adhesively bonded to foam supports or molleton, has succeeded in deriving the following trends:

The glass textile which will be in contact with the paint or with the atmosphere of the room must have an air permeability within a certain range. The air permeability must be sufficient to enable sound to penetrate into the underlying layer, but should not exceed a value beyond which the material would have an unsatisfactory appearance in the painted state.

The adhesive layer attaching the glass textile to the support must not block all the surface pores of the support; in other words it must leave microscopic zones free where the sound that has passed through the surface layer can penetrate into the underlying layer in order to be absorbed therein. The amount of adhesive must, however, be sufficient to enable good attachment of the glass textile to the support, failing which the sound absorption coefficient decreases.

When the support of the coating is a foam, the open porosity of the foam must be as high as possible. This is because it is at the interface between the walls of the foam and the air within the foam that sound is absorbed. The greater the extent of this sound-accessible interface, the better the sound absorption coefficient will be.

When the support of the covering is a nonwoven, it is advantageously a viscose fiber nonwoven having a mass per unit area of between 150 $g/m^2$ and 500 $g/m^2$.

The applicant has thus observed that by optimizing the above parameters (air permeability of the glass textile at the surface, structure of the adhesive layer and porosity of the foam support or mass per unit area of the nonwoven support) it was possible to obtain very thin wall coverings having, in the painted state, an $\alpha_w$ index, determined according to NF EN ISO 354 and NF EN ISO 11654, greater than or equal to 0.15, while at the same time allowing a considerable reduction in the effusivity and diffusivity of walls composed of materials of conventional construction, such as plaster and concrete.

A subject of the present invention, accordingly, is a multilayer structure, with an overall thickness of between 1.5 and 3.3 mm, preferably between 1.7 and 3.0 mm, which is intended for use as a covering for walls, ceilings or floors, comprising:

(a) a support layer formed by an organic polymer foam having an open porosity of between 0.50 and 0.995, or by a viscose fiber nonwoven having a mass per unit area of between 150 $g/m^2$ and 500 $g/m^2$, (b) a surface layer formed by a glass textile, having a static air flow resistance, measured according to the standard ISO 9053, of between $10^5$ $N \cdot s \cdot m^{-4}$ and $10^6$ $N \cdot s \cdot m^{-4}$, preferably between $5 \times 10^5$ $N \cdot s \cdot m^{-4}$ and $8.5 \times 10^5$ $N \cdot s \cdot m^{-4}$, in particular between $7 \times 10^5$ $N \cdot s \cdot m^{-4}$ and $8 \times 10^5$ $N \cdot s \cdot m^{-4}$, (c) at the interface between the support layer (a) and the surface layer (b), a discontinuous adhesive layer having a mass per unit area of between 17 and 60 $g/m^2$.

In the present invention, the three layers (a), (b) and (c) are contiguous with one another; in other words, the adhesive layer (c) attaches the surface layer (b) directly to the foam support layer (a), without any other layer (for example aluminum foil, reinforcing layer or spacer layer) being present between layer (a) and layer (b).

The static air flow resistance values above are those measured for the glass textile in the unpainted state and, of course, before adhesive bonding to the foam.

The foam forming layer (a) of one embodiment of the multilayer covering of the present invention is a soft and elastic foam, having open porosity, in other words a foam where all the cells, or almost all, are in communication with one another. Since the measurement of this open porosity is not the subject of standards, the method which was used for characterizing the foams of the support layer (a) is based on that described in the article by L. L. Beranek in "Acoustic impedance of porous materials", *J. Acoust. Soc. Am.* 13: 248-260, 1942.

The open porosity of the foams used for the support layer (a) is preferably between 0.80 and 0.97, in particular between 0.83 and 0.96, and more particularly still between 0.87 and 0.95.

Mention may be made, as examples of such foams, of those based on polyurethane, especially on polyester urethane, neoprene, silicone, polyethylene, SBR latex and melamine.

In one preferred embodiment, the foams used are agglomerates formed from foam particles that result from recycling and that are agglomerated, for example, using a binder or by simple heating under pressure.

The foam forming support layer (a) preferably has a density of between 10 and 120 $kg/m^3$, in particular between 30 and 100 $kg/m^3$ and more preferably between 50 and 90 $kg/m^3$.

Its static air flow resistance, measured according to the standard ISO 9053, is advantageously between 13 000 and 50

000 N·s·m$^{-4}$, preferably between 13 000 N·s·m$^{-4}$ and 20 000 N·s·m$^{-4}$, in particular between 14 000 and 18 000 N·s·m$^{-4}$.

Such foams are available on the market, in various thicknesses, under the names Agglo80 (agglomerated polyurethane foam sold by the company Carpenter), LM 2033, SKT 2537 and HYPORE 30 FR (polyurethane foams sold by the company Foam Partner), Basotech 3012 (melamine foam sold by the company Foam Partner) and Resorbson BS (melamine foam sold by the company Pinta Enac).

The foam used for the present invention will have a thickness of between 1.5 and 2.5 mm, before incorporation in the multilayer structure. Owing to its elasticity, it will essentially retain this thickness after adhesive bonding of the glass textile and of an optional underlayer.

In another embodiment, the support layer (a) of the multilayer complex of the present invention is not a foam, but a nonwoven based on viscose fibers. As already indicated above, this nonwoven has a mass per unit area of between 150 g/m$^2$ and 500 g/m$^2$, preferably between 200 and 400 g/m$^2$, and in particular between 200 and 300 g/m$^2$.

This nonwoven may optionally include a minority fraction of synthetic fibers. In that case it contains at least 75% by weight, preferably at least 80% by weight, in particular at least 90% by weight of viscose fibers, and not more than 25% by weight, preferably not more than 20% by weight, and in particular not more than 10% by weight of synthetic fibers, these percentages being based on the sum of the viscose fibers and the synthetic fibers.

The viscose fibers are advantageously very fine fibers, having a linear density of between 1 and 20 dtex, preferably between 2 and 10 dtex and in particular between 3 and 8 dtex. The viscose fibers are short fibers (staple) having lengths of between 1 and 50 mm, preferably between 5 and 40 mm and in particular between 10 and 30 mm.

The synthetic fibers, optionally present in a proportion of not more than 25% by weight, are generally thermoplastic polymer fibers selected preferably from polyolefin fibers, such as polypropylene fibers, and polyester fibers. The linear density of the synthetic fibers is preferably not very different from that of the viscose fibers, and is advantageously between 1 and 30 dtex, preferably between 2 and 20 dtex and in particular between 3 and 10 dtex. The length of the synthetic fibers is situated within the same ranges as those indicated above for the viscose fibers.

As already explained in the introduction, it is essential in the present invention that the adhesive layer at the interface between the layers (a) and (b) is not a continuous layer, formed for example by insertion of an adhesive film, such as, for example, in FR 2 672 908, U.S. Pat. No. 5,681,408 or FR 0 061 369.

The adhesive layer (c) must firmly adhesively bond the glass textile (b) to the support (a), while leaving a maximum of pores located at the interface between the layers (a) and (b) open. It is unfortunately very difficult, or even impossible, to quantify precisely the proportion of closed or open surface pores in the finished product.

In order to arrive at satisfactory acoustic results, it is necessary to keep to certain application quantities per unit of surface area and not to deposit the adhesive in the form of a continuous film or layer. The adhesive must be deposited so as to cover relatively homogeneously, on the macroscopic scale, the entire extent of the interface, but it will be ensured that, on the microscopic scale, only certain zones are covered with adhesive and others remain empty. Such a "discontinuous" application may be carried out for example using a hot-melt adhesive in the form of a web or grid that is solid at ambient temperature, which is inserted between the foam support or the viscose nonwoven and the glass fabric before the assembly is subjected to heating, under pressure, at a temperature above the softening or melting temperature of the adhesive. It is also possible to envisage applying the adhesive in the form of a hot-melt adhesive powder onto the viscose nonwoven or the foam support, on the one hand (layer (a)) and/or onto the glass textile (layer (b)), on the other, then applying the second layer (b) or (a) and heating under pressure.

The chemical nature of the hot-melt adhesive is not a determining factor for the present invention and it will be possible to use conventional hot-melt adhesives based on polyurethanes, copolyamide (coPA) or copolymers of PET (coPET), such as for example the product Texiron 9D8 supplied by the company Protechnic.

Finally, the adhesive is not necessarily a hot-melt adhesive but may be a liquid composition of a reactive or thermosetting adhesive that is applied, for example, by printing to one of the two components to be adhesively bonded, making sure that the adhesive composition does not form a continuous film or layer.

The application in "discontinuous" mode described above will, however, only give good acoustic results if the application quantities specified above, of between 17 and 60 g/m$^2$, preferably between 20 and 40 g/m$^2$, in particular between 21 and 30 g/m$^2$ and ideally between 22 and 27 g/m$^2$, are also respected. Indeed, if the quantities of adhesive applied are significantly greater than 60 g/m$^2$ of surface, the hot-melt adhesive risks spreading at the time of melting until a continuous layer is formed that blocks the surface pores of the nonwoven or the foam, which must absolutely be avoided. Conversely, if the quantities applied are significantly below 17 g/m$^2$, the adhesive strength at the support layer/glass textile interface risks being insufficient and the applicant has observed that the finished product then has absorption coefficients that are considerably worse, of the order of 0.05 to 0.10.

When the adhesive layer (c) is formed by a hot-melt adhesive, the softening point of the latter is preferably at least 10° C., in particular at least 15° C. and ideally at least 20° C. below the softening point of the polymer forming the support layer (a). This is because it is necessary to prevent the porous structure of said layer from being unfavorably modified under the influence of the laminating heat and pressure.

When all of the instructions above regarding the application method and quantities are respected, the adhesive layer (c), in the finished product, consists of a network of points and/or lines extending homogeneously over the entire interface between the layers (a) and (b). The adjective "homogeneous" here has the meaning of uniform on the macroscopic scale, and encompasses both ordered and random patterns on the microscopic scale.

The glass textile forming the surface layer (b) may be a glass cloth (that is to say a woven fabric consisting of warp and weft yarns) or a web (that is to say a nonwoven). It is also possible to envisage a combination of the latter, for example a nonwoven reinforced by a woven structure. The present invention does not, however, encompass glass textiles such as glass felts having a very loose structure that are obtained by needle punching. Such textiles, when they have a satisfactory mechanical strength, specifically have a thickness that is too great and above all do not generally lend themselves to the application of a paint.

The glass textile is preferably a glass cloth, that is to say a woven fabric obtained from glass yarns composed of a multitude of glass filaments (or strands) or derivatives of these yarns, especially the assemblies of these strands as rovings.

The glass cloth or web may optionally contain a relatively limited fraction, generally less than 20% by weight, preferably less than 10% by weight, of fibers consisting of an organic material. These other fibers may be natural fibers such as silk fibers, wool fibers, wood fibers, cellulose fibers or cotton fibers; synthetic or artificial fibers such as viscose or rayon fibers, polyethylene fibers, polypropylene fibers, polyethylene terephthalate fibers, polystyrene fibers, polymethyl methacrylate fibers, polyamide fibers, polyvinyl chloride fibers, polyacrylonitrile fibers, polyvinyl acetate fibers, polyvinyl alcohol fibers, polyester fibers, polytetrafluorethylene fibers and aramid fibers; metallic fibers, for example silver fibers, copper fibers or steel fibers; carbon fibers; mineral fibers, for example basalt fibers, silica fibers, alumina fibers or ceramic fibers.

The glass incorporated in the composition of the yarns may be of any type, for example of E, C, R or AR (alkali resistant) type. In particular, E glass is preferred.

The diameter of the glass filaments forming the yarns may vary within in a broad range of, for example, from 5 to 30 μm. The linear density of the filaments may be between 30 and 1500 tex.

Advantageously, the glass cloth comprises, as warp, a twisted glass yarn (textile yarn) and, as weft, an untwisted glass yarn that has undergone a treatment that aims to separate the glass filaments so as to give them volume ("volumized" yarns). The linear density of the warp and weft yarns varies preferably from 50 to 500 tex.

Conventionally, the cloth or web to be painted is coated with a sizing composition that maintains the yarns and gives them suitable rigidity so that the installation on the final support can be carried out properly.

The glass textiles used in the present invention are known in the art and are available on the market, for example under the name Novelio from the company Adfors. They preferably have a mass per unit area of between 80 and 450 g/m$^2$, in particular between 100 and 300 g/m$^2$ and more preferably still between 120 and 250 g/m$^2$.

The multilayer structure of the present invention may comprise, in addition to the three layers (a), (b) and (c) described above, a fourth layer, referred to hereinbelow as underlayer (d), that is preferably permeable to water vapor and adhesively bonded to the face of the support layer (a) opposite the face in contact with the surface layer (b).

This underlayer may be, for example, a film of plastic, a sheet of paper, a perforated metallic film, a woven fabric, a nonwoven fabric or a combination thereof.

This underlayer is mainly intended to facilitate the coating with adhesive of the multilayer structure before application to the walls of the room whose acoustic comfort is to be improved. This underlayer (d) may of course be pre-coated with adhesive.

Finally, the multilayer structure of the present invention may comprise a fifth layer, referred to hereinbelow as overlayer (e), formed by a layer of paint applied to the surface layer (b).

This paint may be applied before adhesive bonding of the structure to the wall, or else the multilayer structure may be painted only after adhesive bonding to the wall.

The overlayer of paint (e) may be any paint commonly used for decorating living spaces. It may comprise aqueous-based acrylic paints or glyptal paints. The final layer of paint may be microporous or not. It is generally applied with a coat weight of less than 600 g/m$^2$, preferably 50 to 500 g/m$^2$, and in particular 100 to 350 m$^2$/g.

As explained in the introduction, the choice of the materials of the various layers has made it possible to obtain wall coverings having, in the painted state, sound absorption coefficients sufficient to allow them to be classified as a sound-absorbing covering according to the standard NF EN ISO 11654 (classes E). This classification may be obtained for exceptionally low thicknesses. The multilayer structures of the present invention, indeed, have an overall thickness not exceeding 3 mm. It is between 1.5 and 3 mm, preferably between 1.7 and 2.8 mm.

The thin coverings of the present invention differ not only in their good sound absorption coefficient but also in their low thermal effusivity, of less than 390 W/(m$^2$·K·s$^{1/2}$), or even less than 200 W/(m$^2$·K·s$^{1/2}$), and in their low thermal diffusivity, of between 0.9×10$^7$ and 5×10$^7$ m$^2$/s, or even between 0.9×107 and 2×10$^7$ m2/s.

Consequently, in spite of their low thickness, the coverings according to the invention allow significant improvement in both the acoustic comfort and the thermal comfort of a room.

The multilayer structures of the present invention may be manufactured according to lamination processes very similar to known processes and on existing installations commonly used for the manufacture of wall coverings.

In one such manufacturing process, which is a subject of the present invention, superposed, in order, are an organic polymer foam structure (or a viscose fiber nonwoven), a web of hot-melt adhesive and a glass textile, then the structure thus formed, comprising at least three layers, is subjected to a temperature at least equal to the softening point of the hot-melt adhesive, preferably while applying a pressure, for example by calendering.

One possible alternative to the use of a hot-melt web is the application of a powder or liquid adhesive composition to one of the faces of the foam (or of the viscose fiber nonwoven) or of the glass textile. Application may be carried out according to an ordered pattern (grid, network of equidistant points), for example by printing, or else according to a random pattern, for example by application of a powder or spraying of a liquid adhesive composition. After application of the adhesive composition, the organic polymer foam structure is brought into contact with the glass textile, preferably under pressure and with heating, so as to adhesively bond the glass textile firmly to the organic polymer foam structure.

A final subject of the present invention is the use of a multilayer structure as described above for improving both the acoustic and the thermal comfort of a room or of a building. The process for improving the acoustic comfort comprises the application of a multilayer structure according to the invention, preferably by adhesive bonding, to one or more inner surfaces of said room or of said building, in particular to the walls.

EXAMPLE 1

Glass Cloth on Foam Support

A melamine foam, sold by the company Silentway, having a density of 10 kg/m$^3$ and a static air flow resistivity of 1.6×10$^4$ N·s·m$^{-4}$ is laminated to a paintable glass cloth having a mass per unit area of 220 g/m$^2$ and a static air flow resistivity of 7.7×10$^5$ N·s·m$^{-4}$.

This lamination takes place using a web of hot-melt adhesive composed of bicomponent fibers with a polyethylene terephthalate (PET) core and a coPET copolymer shell, this shell having a softening point below that of the central part made of PET homopolymer. The web of hot-melt adhesive has a mass per unit area of 25 g/m$^2$. The three layers are superposed on one another and the assembly is adhesively bonded by heating at a temperature of around 90° C. under a calendering pressure of around 0.5 bar. The three-layer structure obtained has a total thickness of 3 mm. Its thermal effusivity and its thermal diffusivity, which are determined by the dynamic plane source method, are, respectively, 134 W/(m$^2$·K·s$^{1/2}$) and 1.01×10$^7$ m$^2$/s.

The three-layer structure is then adhesively bonded to BA13 plasterboard using a vinyl adhesive (Ovalit Ultra, from the company Henkel) and painted with a satin acrylic paint (150 g/m²). A surface of 10.80 m² is thus used for the tests in a reverberation room (NF EN ISO 354) and the sound absorption coefficient calculated according to NF EN ISO 11654 is 0.15, which enables this three-layer structure to be classified in class E.

EXAMPLE 2

Glass Cloth on Viscose Nonwoven Support

A nonwoven is produced which is composed of viscose fibers having a linear density of 3.3 dtex. The nonwoven has a thickness (determined according to the standard E10 D45 1195 at a pressure of 13.8 kPa) of around 2.8 mm and a mass per unit area of 250 g/m² (molleton A).

Also produced are two nonwovens very similar to molleton A, but with replacement of 10% by weight of the viscose fibers by, respectively, 10% by weight of polypropylene fibers having a linear density of 3.3 dtex (molleton B) and 10% by weight of polyester fibers also having a linear density of 3.3 dtex (molleton C).

These two blend-fiber molletons B and C have a thickness (determined according to the standard E10 D45 1195 at a pressure of 13.8 kPa) of 2.9 mm and a mass per unit area of 250 g/m².

Each of the molletons A, B and C above is laminated to a paintable glass cloth having a mass per unit area of 220 g/m² and a static air flow resistivity of $7.7 \times 10^5$ N·s·m⁻⁴.

This lamination takes place using a web of hot-melt adhesive composed of bicomponent fibers with a polyethylene terephthalate (PET) core and a coPET copolymer shell, this shell having a softening point below that of the central part made of PET homopolymer. The web of hot-melt adhesive has a mass per unit area of 25 g/m². The three layers are superposed on one another and the assembly is adhesively bonded by heating at a temperature of around 90° C. under a calendering pressure of around 0.5 bar. The three-layer structure obtained has a total thickness of around 3 mm.

The three-layer structures obtained are then adhesively bonded to BA13 plasterboard panels using a vinyl adhesive (Ovalit Ultra, from the company Henkel) and painted with a satin acrylic paint (150 g/m²). A surface of 10.80 m² is thus used for the tests in a reverberation room (NF EN ISO 354) and the sound absorption coefficient is calculated according to NF EN ISO 11654.

The table above shows the sound absorption coefficient ($\alpha_w$), and also the thermal effusivity and the thermal diffusivity, of the three resulting multilayer coverings, as determined by the dynamic plane source method.

For comparison, the effusivity of the uncoated BA13 plaster is 557.23 W/(m²·K·s^(1/2)) and its diffusivity is $2.9 \times 10^7$ m²/s.

| Molleton forming the support layer (a) | Overall thickness (mm) | $\alpha_W$ | Effusivity (W/(m²·K·s^(1/2))) | Diffusivity (m²/s) |
|---|---|---|---|---|
| A (100% viscose) | 3 | 0.15 | 170.71 | $0.93 \times 10^7$ |
| B (90% viscose, 10% polypropylene) | 3 | 0.15 | 153 | $0.94 \times 10^7$ |
| C (90% viscose, 10% polyester) | 3 | 0.15 | 137.4 | $1.1 \times 10^7$ |

It is found that all of the three coverings according to the invention make it possible, for an overall thickness not exceeding 3 mm, to reduce significantly the effusivity and diffusivity of the walls. It may further be noted that a small fraction of the viscose fibers is replaced advantageously by synthetic fibers (polypropylene, polyester), this replacement resulting in a decrease in the thermal effusivity but also in a slight increase in the diffusivity.

The invention claimed is:

1. A multilayer structure, having an overall thickness of between 1.5 and 3.3 mm, comprising:
    (a) a support layer formed by
        an organic polymer foam having an open porosity between 0.50 and 0.995, or by
        a viscose fiber nonwoven having a mass per unit area of between 150 g/m² and 500 g/m²,
    (b) a surface layer formed by a glass textile, having a static air flow resistance, measured according to the standard ISO 9053, of between $10^5$ N·s·m⁻⁴ and $10^6$ N·s·m⁻⁴,
    (c) at the interface between the support layer (a) and the surface layer (b), a discontinuous adhesive layer having a mass per unit area of between 17 and 60 g/m².

2. The multilayer structure as claimed in claim 1, wherein the support layer is an organic polymer foam and has a density of between 10 and 120 kg/m³.

3. The multilayer structure as claimed in claim 2, wherein the support layer (a) has a static air flow resistance, measured according to the standard ISO 9053, of between 13 000 and 50 000 N·s·m⁻⁴.

4. The multilayer structure as claimed in claim 1, wherein the support layer (a) is a viscose fiber nonwoven and wherein the viscose fibers have a linear density of between 1 and 20 dtex.

5. The multilayer structure as claimed in claim 4, wherein the support layer (a) contains at least 75% by weight of viscose fibers, and not more than 25% by weight of synthetic fibers, these percentages being based on the sum of the viscose fibers and of the synthetic fibers.

6. The multilayer structure as claimed in claim 5, wherein the synthetic fibers are thermoplastic polymer fibers selected from polyolefin fibers and polyester fibers.

7. The multilayer structure as claimed in claim 1, wherein the adhesive layer (c) comprises a hot-melt adhesive having a softening point at least 10° C. below the softening point of the polymer forming the support layer (a).

8. The multilayer structure as claimed in claim 1, wherein the adhesive layer (c) consists of a network of points and/or lines extending homogeneously over the entire interface between the layers (a) and (b).

9. The multilayer structure as claimed in claim 1, wherein the surface layer (b) is a glass cloth or a glass fiber nonwoven.

10. The multilayer structure as claimed in claim 1, wherein the surface layer (b) has a mass per unit area of between 80 and 450 g/m².

11. The multilayer structure as claimed in claim 1, further comprising an underlayer (d) adhesively bonded to the face of the support layer (a) opposite the face in contact with the surface layer (b).

12. The multilayer structure as claimed in claim 1, further comprising a paint overlayer (e) applied to the surface layer (b).

13. The multilayer structure as claimed in claim 1, wherein the multilayer structure has a thermal effusivity of less than 390 W/(m²·K·s^(1/2)), and a thermal diffusivity of between $0.9 \times 10^7$ and $5 \times 10^7$ m²/s.

14. A process for improving the acoustic comfort and the thermal comfort of a room or of a building, comprising applying a multilayer structure as claimed in claim 1 by adhesive bonding, to one or more internal walls of said room or of said building.

15. A process for manufacturing a multilayer structure as claimed in claim 1, comprising superposing an organic polymer foam structure or a viscose fiber nonwoven, a web of hot-melt adhesive and a glass textile, and heating the structure comprising at least three layers thus formed to a temperature at least equal to the softening point of the hot-melt adhesive.

16. A process for manufacturing a multilayer structure as claimed in claim 1, comprising applying an adhesive composition in an ordered or random pattern to a viscose fiber nonwoven or to an organic polymer foam structure, on the one hand, and/or to a glass textile, on the other hand, contacting the viscose fiber nonwoven or the organic polymer foam structure with the glass textile, so as to adhesively bond the glass textile to the glass fiber nonwoven or to the organic polymer foam structure.

17. The multilayer structure as claimed in claim 1, wherein the overall thickness of the multilayer structure is between 1.7 and 3.0 mm.

18. The multilayer structure as claimed in claim 1, wherein the open porosity is between 0.80 and 0.97.

19. The multilayer structure as claimed in claim 1, wherein the viscose fiber nonwoven has a mass per unit area of between 200 and 400 g/m$^2$.

20. The multilayer structure as claimed in claim 1, wherein the static air flow resistance, measured according to the standard ISO 9053, is between $5 \times 10^5$ N·m$^{-4}$ and $8.5 \times 10^5$ N·s·m$^{-4}$.

21. The multilayer structure as claimed in claim 1, wherein the discontinuous adhesive layer has a mass per unit area of between 20 and 40 g/m$^2$.

22. The multilayer structure as claimed in claim 2, wherein the support layer has a density of between 30 and 100 kg/m$^3$.

23. The multilayer structure as claimed in claim 3, wherein the support layer (a) has a static air flow resistance, measured according to the standard ISO 9053, of between 13 000 and 20 000 N·s·m$^{-4}$.

24. The multilayer structure as claimed in claim 4, wherein the viscose fibers have a linear density of between 2 and 10 dtex.

25. The multilayer structure as claimed in claim 5, wherein the support layer (a) contains at least 80% by weight of viscose fibers, and not more than 20 by weight of synthetic fibers.

26. The multilayer structure as claimed in claim 7, wherein the hot-melt adhesive has a softening point at least 15° C. below the softening point of the polymer forming the support layer (a).

27. The multilayer structure as claimed in claim 10, wherein the surface layer (b) has a mass per unit area of between 100 and 300 g/m$^2$.

28. The multilayer structure as claimed in claim 11, wherein the underlayer (d) is permeable to water vapor.

29. The multilayer structure as claimed in claim 13, wherein the multilayer structure has a thermal effusivity of less than 200 W/(m$^2$·K·s$^{1/2}$), and a thermal diffusivity of between $0.9 \times 10^7$ and $2 \times 10^7$ m$^2$/s.

* * * * *